US012070937B2

(12) United States Patent
Tokuda et al.

(10) Patent No.: US 12,070,937 B2
(45) Date of Patent: Aug. 27, 2024

(54) PRINTING APPARATUS

(71) Applicant: CANON KABUSHIKI KAISHA, Tokyo (JP)

(72) Inventors: Kouhei Tokuda, Tokyo (JP); Toshinobu Tokita, Kanagawa (JP); Hideyuki Nozawa, Tochigi (JP); Yasuyuki Asai, Tokyo (JP); Ryutaro Taira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/354,496

(22) Filed: Jul. 18, 2023

(65) Prior Publication Data

US 2023/0356536 A1 Nov. 9, 2023

Related U.S. Application Data

(63) Continuation of application No. 17/458,077, filed on Aug. 26, 2021, now Pat. No. 11,745,521.

(30) Foreign Application Priority Data

Sep. 1, 2020 (JP) ................................ 2020-147157

(51) Int. Cl.
*B41J 15/18* (2006.01)
*B41J 11/00* (2006.01)
*B41J 11/42* (2006.01)
*B41J 13/00* (2006.01)
*B41J 13/10* (2006.01)

(52) U.S. Cl.
CPC ............ *B41J 11/42* (2013.01); *B41J 11/0045* (2013.01); *B41J 13/0018* (2013.01); *B41J 13/103* (2013.01); *B41J 15/18* (2013.01)

(58) Field of Classification Search
CPC .. B41J 15/18; B65H 75/4484; B65H 2553/80; B65H 2553/82; B65H 2553/83; B65H 63/028; B65H 19/105
See application file for complete search history.

(56) References Cited

U.S. PATENT DOCUMENTS 9,561,920 B1 * 2/2017 Wilsher ............. G03G 15/6502
2002/0130941 A1 * 9/2002 Tanaami .................. B41J 15/18 347/104
2014/0313271 A1 * 10/2014 Morinaga ............ B65H 16/005 242/566

FOREIGN PATENT DOCUMENTS

JP 2012158111 A 8/2012

* cited by examiner

*Primary Examiner* — Scott A Richmond
(74) *Attorney, Agent, or Firm* — Canon U.S.A., Inc. IP Division

(57) ABSTRACT

A printing apparatus includes a plurality of set units to set rolled print media, a conveyance unit to convey the print media, a printing unit, a detection unit, and display units. The printing unit prints an image on the print media conveyed by the conveyance unit. The detection unit detects whether any one of the print media is fed to a predetermined printable position at which printing is performable by the printing unit. Each display unit is provided on a different one of the plurality of set units and configured to indicate whether a print medium set in a corresponding set unit is being fed. When the printing unit performs printing on the print medium, each display unit indicates whether the print medium set in the corresponding set unit is being fed in accordance with a result of detection performed by the detection unit.

32 Claims, 11 Drawing Sheets

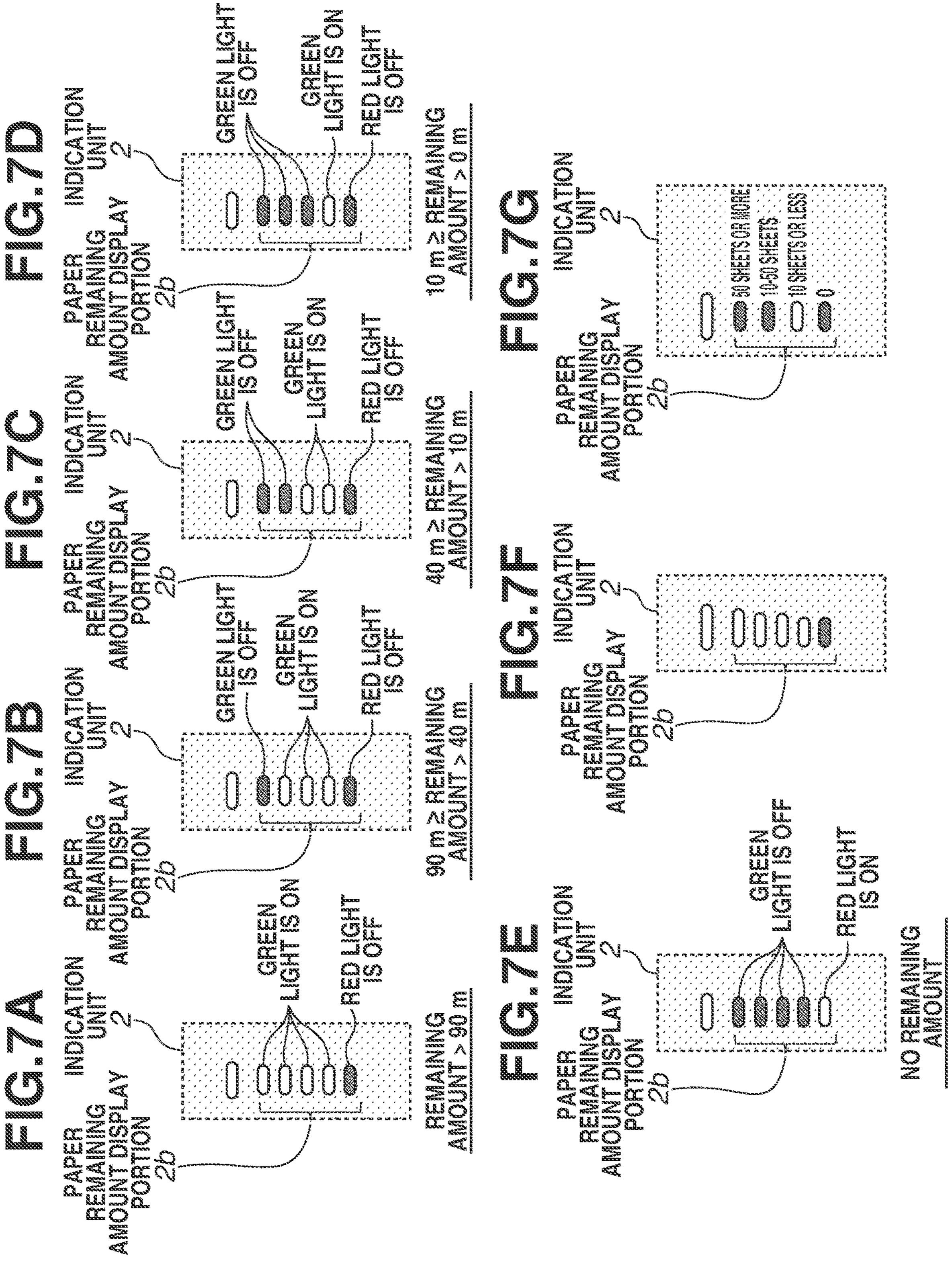
FIG.7A
PAPER REMAINING AMOUNT DISPLAY PORTION
2b
INDICATION UNIT
2
GREEN LIGHT IS ON
RED LIGHT IS OFF
REMAINING AMOUNT > 90 m
FIG.7B
PAPER REMAINING AMOUNT DISPLAY PORTION
2b
INDICATION UNIT
2
GREEN LIGHT IS OFF
GREEN LIGHT IS ON
RED LIGHT IS OFF
90 m ≥ REMAINING AMOUNT > 40 m
FIG.7C
PAPER REMAINING AMOUNT DISPLAY PORTION
2b
INDICATION UNIT
2
GREEN LIGHT IS OFF
GREEN LIGHT IS ON
RED LIGHT IS OFF
40 m ≥ REMAINING AMOUNT > 10 m
FIG.7D
PAPER REMAINING AMOUNT DISPLAY PORTION
2b
INDICATION UNIT
2
GREEN LIGHT IS OFF
GREEN LIGHT IS ON
RED LIGHT IS OFF
10 m ≥ REMAINING AMOUNT > 0 m
FIG.7E
PAPER REMAINING AMOUNT DISPLAY PORTION
2b
INDICATION UNIT
2
GREEN LIGHT IS OFF
RED LIGHT IS ON
NO REMAINING AMOUNT
FIG.7F
PAPER REMAINING AMOUNT DISPLAY PORTION
2b
INDICATION UNIT
2
FIG.7G
PAPER REMAINING AMOUNT DISPLAY PORTION
2b
INDICATION UNIT
2
50 SHEETS OR MORE
10-50 SHEETS
10 SHEETS OR LESS
0

| type | Width | set |
|---|---|---|
| inch | 6" | |
| | 8" | |
| | ... | |
| | 24" | 1 |
| | 36" | 2 |
| | ... | |
| A | A4 | |
| | ... | |
| | A1 | 3 |
| | A0 | 4 |
| B | B4 | |
| | ... | |
| | B1 | |
| | B0 | |

BLINKING PATTERN

COLOR LIGHTING PATTERN

MULTIPLE LIGHTING PATTERN

PRINTING APPARATUS

CROSS-REFERENCE TO RELATED APPLICATIONS

The present application is a continuation of U.S. patent application Ser. No. 17/458,077, filed on Aug. 26, 2021, which claims priority from Japanese Patent Application No. 2020-147157 filed Sep. 1, 2020, which are hereby incorporated by reference herein in their entireties.

BACKGROUND

Field

The present disclosure relates to a printing apparatus.

Description of the Related Art

A printing apparatus having a configuration in which a rolled print medium can be set in the printing apparatus is known.

Japanese Patent Application Laid-Open No. 2017-071194 discusses a technique for determining whether a sheet loaded on a platen is a roll sheet set in which one of an upper stage and a lower stage, and for displaying the determination result on an operation panel in a standby state before printing is started.

In some cases, the display configuration as discussed in Japanese Patent Application Laid-Open No. 2017-071194 however is not sufficient in terms of user-friendliness.

In a case where a user accesses a print medium set in a printing apparatus, it may be demanded that recognition as to whether the print medium set in the printing apparatus is being fed in a printable state be facilitated.

SUMMARY

The present disclosure is directed to enabling a user to easily recognize whether a print medium set in a printing apparatus is being fed.

According to an aspect of the present disclosure, a printing apparatus includes a plurality of set units for setting print media, wherein the print media is a plurality of rolled print media, a conveyance unit configured to convey the print media, a printing unit configured to print an image on the print media conveyed by the conveyance unit, a detection unit configured to detect whether any one of the print media is fed to a predetermined printable position at which printing is performable by the printing unit, and a plurality of display units, each provided on a different one of the plurality of set units and configured to indicate whether a print medium set in a corresponding set unit is being fed, wherein, when the printing unit performs printing on the print medium, each display unit indicates whether the print medium set in the corresponding set unit is being fed in accordance with a result of detection performed by the detection unit.

Further features of the present disclosure will become apparent from the following description of exemplary embodiments with reference to the attached drawings.

BRIEF DESCRIPTION OF THE DRAWINGS

FIGS. 7A to 7G each illustrate a display of the paper remaining amount display portion according to the second exemplary embodiment.

DESCRIPTION OF THE EMBODIMENTS

Figure 1A:
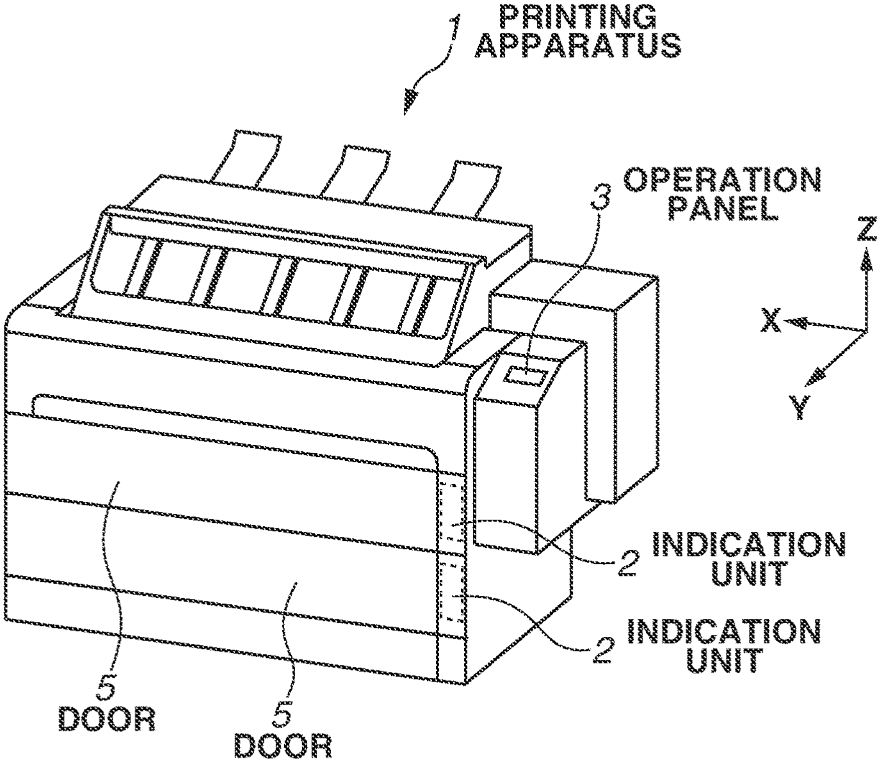
FIGS. 1A and 1B are perspective views each illustrating a printing apparatus according to a first exemplary embodiment.
Figure 1B:
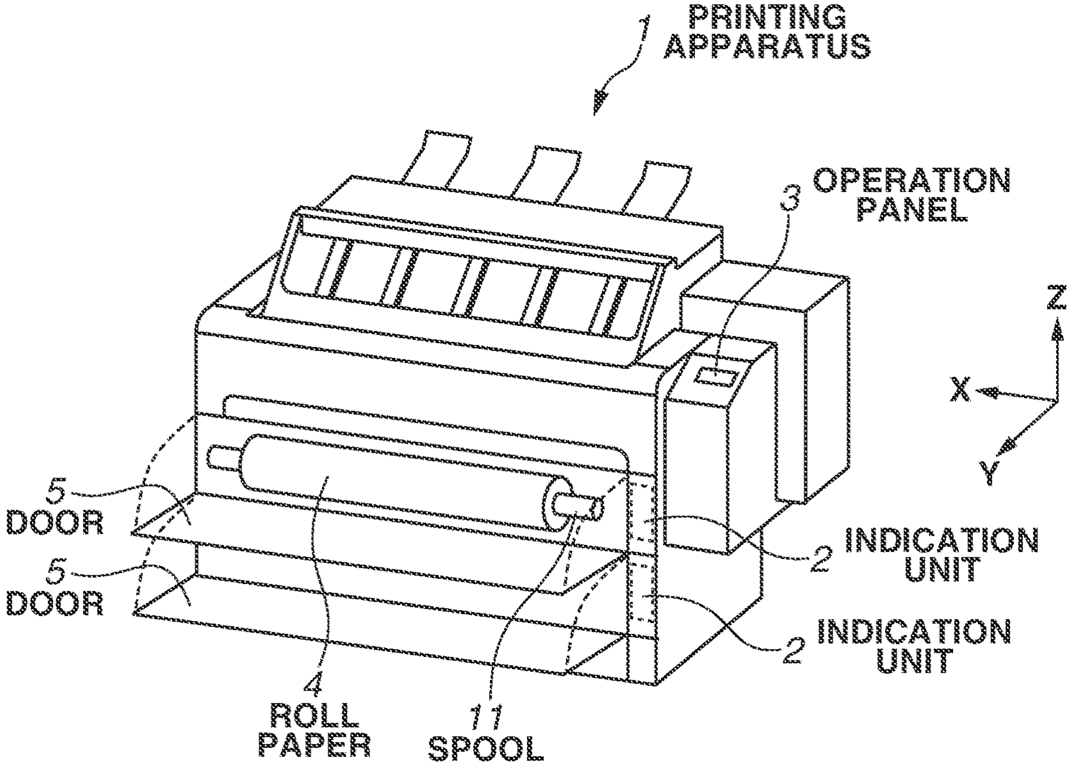

A first exemplary embodiment of the present disclosure will be described below. FIGS. 1A and 1B are perspective views each illustrating an overall configuration of a printing apparatus 1 according to the present exemplary embodiment. FIG. 1B illustrates a state where doors are opened when roll paper is set. The printing apparatus 1 performs printing by an inkjet printing method. Indication units 2 each display a state of a print medium to be printed. An operation panel 3 is used to operate the printing apparatus 1. A touch panel display is used as the operation panel 3. Roll paper 4 is a sheet-like print medium on which printing is performed, and the sheet-like print medium is wound around a core in a roll shape. The print medium is typified by paper, but is not limited to paper. For convenience of explanation, the print medium is referred to as paper. The printing apparatus 1 according to the present exemplary embodiment includes two stages of set units in which the roll paper 4 is set, and the indication units 2 are each provided at the position corresponding to the respective two stages. The number of stages in which the roll paper 4 is set is not limited to two, but instead may be one or three or more. Each door 5 is pivotally moved about a lower portion of the corresponding door 5, thus being opened or closed. To prevent contamination, the doors 5 are used in a closed state when the printing apparatus 1 is in a normal operation state. However, in the case of setting or replacing the roll paper 4, the doors 5 are used in an open state. Herein, the expression “set the roll paper 4” means that a spool holding portion (not illustrated) for setting a spool 11 in the printing apparatus 1 is set by passing the spool 11 through a core of the roll paper 4. The expression “feed paper” means that the roll paper 4 is set and the leading edge of the roll paper 4 is conveyed to a printable position. These expressions are used in the following description. In place of the doors 5, drawers may also be used to obtain the same advantageous effects.

Figure 2:
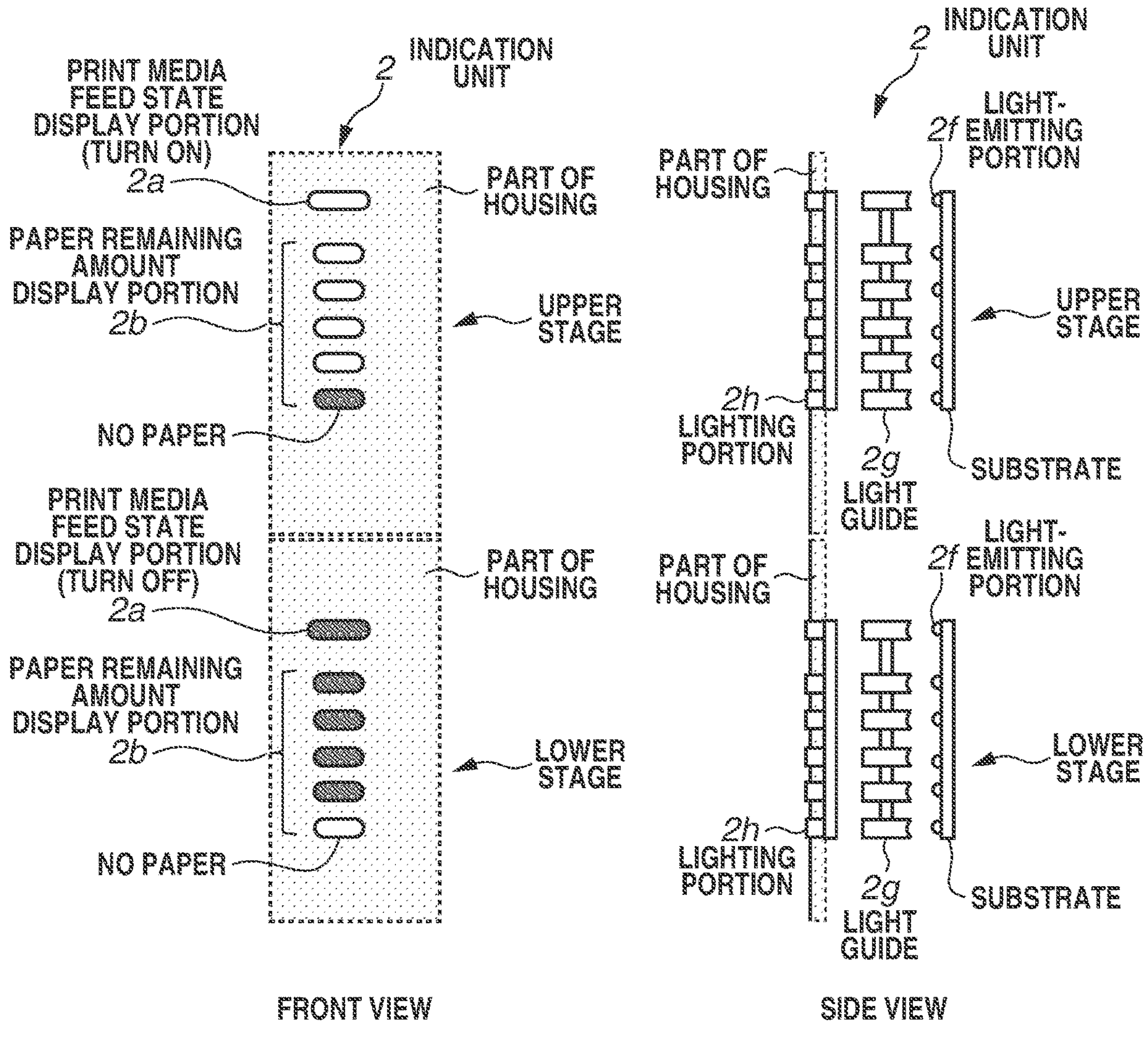
FIG. 2 illustrates an indication unit according to the first exemplary embodiment.

FIG. 2 illustrates a front view of the indication units 2 and a sectional view of the indication units 2 as viewed from a side surface thereof. As illustrated in the front view of FIG. 2, the display of each indication unit 2 includes a print media feed state display portion 2*a* indicating a print media feed state, and a paper remaining amount display portion 2*b* indicating the remaining amount of the roll paper 4. Display portions (display unit) according to the present embodiment include a print media feed state lighting portion and a remaining amount lighting portion each including a lighting portion. The lighting state of each of the print media feed state lighting portion and the remaining amount lighting portion is used to notify a user of the state of each of the set units. The print media feed state display portion 2*a* is turned on when the roll paper 4 is fed into the printing apparatus 1 and is in a printable state, otherwise turned off printing apparatus. Specifically, the print media feed state display portion 2*a* is turned off when the roll paper 4 is set and is not fed into the printing apparatus 1 yet, or when the roll paper 4 is not set. In addition, the print media feed state may be displayed by changing the color of light between the printable state and a state other than the printable state. The paper remaining amount display portion 2*b* includes a plurality of lighting portions and displays the paper remaining amount by changing the number of lighting portions to be turned on depending on the paper remaining amount.

The layout and size of the lighting portions of each indication unit 2 according to the present exemplary embodiment will be described. In the present exemplary embodiment, the print media feed state display portion 2*a* and the paper remaining amount display portion 2*b* are aligned at the same position in the X-direction. The two indication units 2 including the lighting portions may be arranged to be located at the same position in the X-direction. The length of the entire lighting portions of each indication unit 2 is 10 cm in the Z-direction. A distance in the Z-direction between the print media feed state display portion 2*a* and the paper remaining amount display portion 2*b* that is located closest to the print media feed state display portion 2*a* is 4 cm. A distance in the Z-direction between the lighting portions of the paper remaining amount display portion 2*b* is 1 cm. The length of the print media feed state display portion 2*a* in the Y-direction is 12 mm, and the length of the paper remaining amount display portion 2*b* in the Y-direction is 10 mm. The distance between the lighting portions is not limited to the above-described distance, but instead can be set to any distance, as long as the state of the corresponding paper feed stage can be recognized. The lighting portions that display different states can be more easily recognized by changing the length of the print media feed state display portion 2*a* and the length of the paper remaining amount display portion 2*b* in the Y-direction.

The shape of each lighting portion is not limited to the shape illustrated in FIG. 2, but instead may be, for example, a circle or square. The print media feed state display portion 2*a* and the paper remaining amount display portion 2*b* may be formed in different shapes. Alternatively, a configuration in which the paper remaining amount display portion 2*b* is omitted and only the print media feed state display portion 2*a* is provided may also be adopted.

As illustrated in the side view of FIG. 2, the configuration of each indication unit 2 includes a light-emitting portion 2*f*, a light guide 2*g*, and a lighting portion 2*h* that are electrically mounted on a single substrate. A light-emitting diode (LED) is suitable for the light-emitting portion 2*f*. The light-emitting portion 2*f* emits light with a predetermined angle of divergence. The light guide 2*g* including a concave lens on at least one surface thereof shapes the emitted light into substantially parallel light, and guides the light to a plane that is substantially flush with a housing of the printing apparatus 1 through the lighting portion 2*h*. It is desirable that the difference in light intensity distribution be reduced by roughening at least one of the surfaces of the lighting portion 2*h* and the light guide 2*g* to scatter light. The light guide 2*g* and the lighting portion 2*h* can be integrally formed. This arrangement enables reduction in the number of components of the printing apparatus 1 and reduction in cost, and thus, an optical axis adjustment which is carried out during assembly of the printing apparatus 1 can be performed at once. Each indication unit 2 according to the present exemplary embodiment is buried in a part of the housing of the printing apparatus 1. Alternatively, an indication unit including the light-emitting portion 2*f*, the light guide 2*g*, and the lighting portion 2*h* may be incorporated in the printing apparatus 1. The light guide 2*g* can be omitted. However, in such a case, it is desirable that a concave lens be used on the back surface of the lighting portion 2*h* as viewed from the front surface of the housing. The light-emitting portion 2*f* emits light with a color that can be easily discriminated based on the relationship between the color and the color of the housing of the printing apparatus 1. For example, if the color of the housing of the printing apparatus 1 is a light color, such as a white color, the light-emitting portion 2*f* may be turned on with a color different from white, such as blue, green, or red, thereby facilitating the discrimination between a turned-on state and a turned-off state. If the color of the housing of the printing apparatus 1 is a dark color, such as a black color, the light-emitting portion 2*f* may be turned on with a light color, such as yellow, instead of using blue, green, or red, thereby facilitating the discrimination between the turned-on state and the turned-off state. Further, different colors are used for the print media feed state display portion 2*a* and the paper remaining amount display portion 2*b*. In the present exemplary embodiment, the print media feed state display portion 2*a* emits blue light, the lighting portion to be turned on in a case where the paper remaining amount display portion 2*b* indicates that there is paper emits green light, and the lighting portion to be turned on in a case where the paper remaining amount display portion 2*b* indicates that there is no paper emits red light. Thus, it can be expected that the visual recognition of the user can be enhanced by changing the colors of emitted light depending on the display function.

Each indication unit 2 displays the state of the corresponding roll paper 4 in an above-described manner, thus enabling the user to intuitively recognize the state of the roll paper 4 from a little far from the printing apparatus 1, without the need for the user to move to the front of the printing apparatus 1.

Figure 3A:
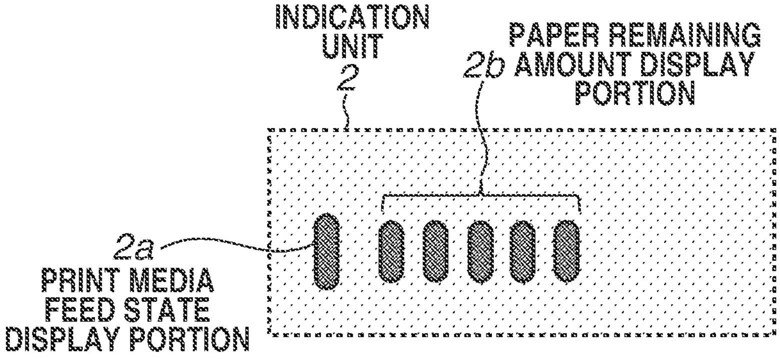
FIGS. 3A to 3C illustrate other examples of the indication unit according to the first exemplary embodiment.
Figure 3B:
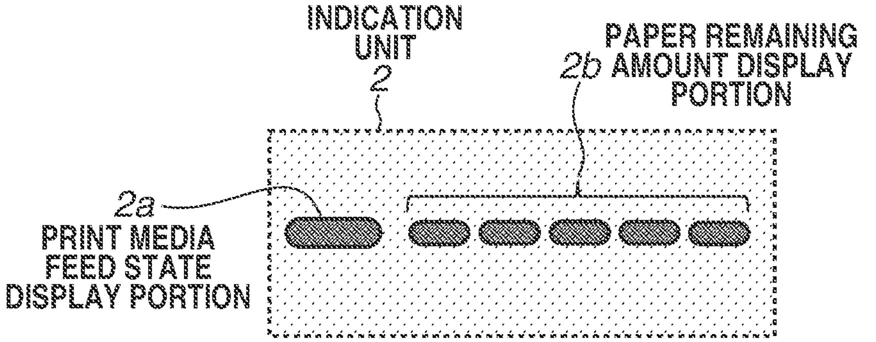
Figure 3C:
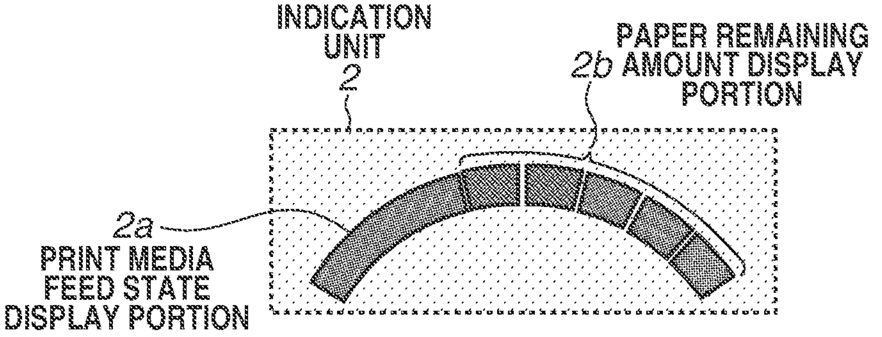

The layout of the print media feed state display portion 2*a* and the paper remaining amount display portion 2*b* of each indication unit 2 is not limited to the layout in which the print media feed state display portion 2*a* and the paper remaining amount display portion 2*b* are vertically arranged as illustrated in FIG. 2. For example, the print media feed state display portion 2*a* and the paper remaining amount display portion 2*b* may be horizontally arranged as illustrated in FIGS. 3A and 3B. Further, the lighting portions of the print media feed state display portion 2*a* and the paper remaining amount display portion 2*b* may be arranged in a longitudinal direction or a lateral direction. A configuration in which the lighting portions are arranged in an arc shape as illustrated in FIG. 3C is also effective.

Figure 4A:
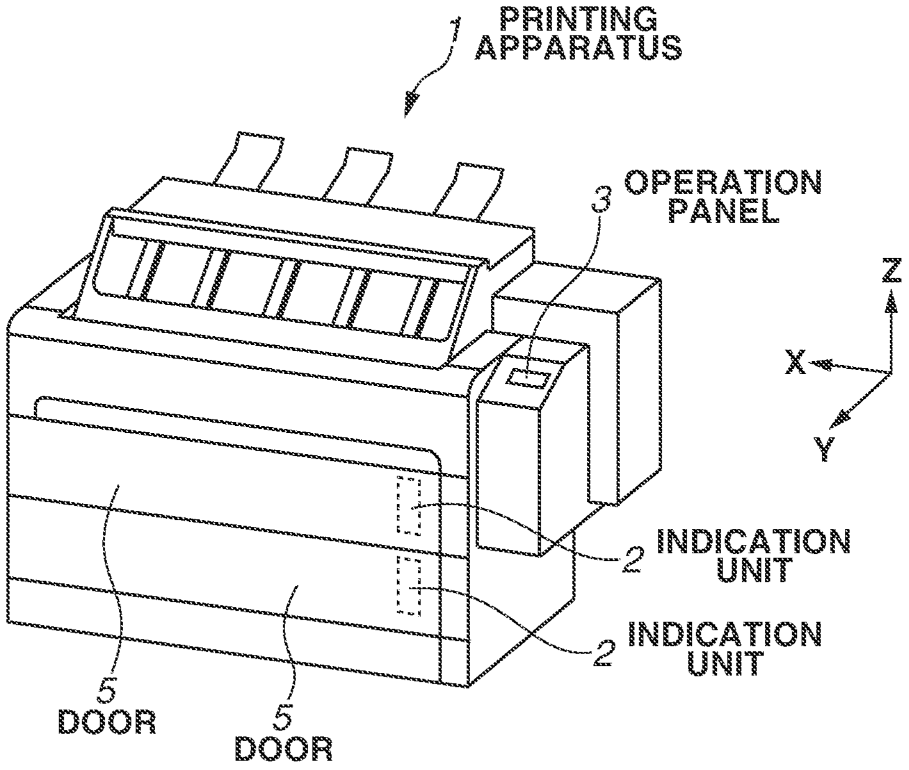
FIG. 4A illustrates another example of the layout of indication units according to the first exemplary embodiment.
Figure 4B:
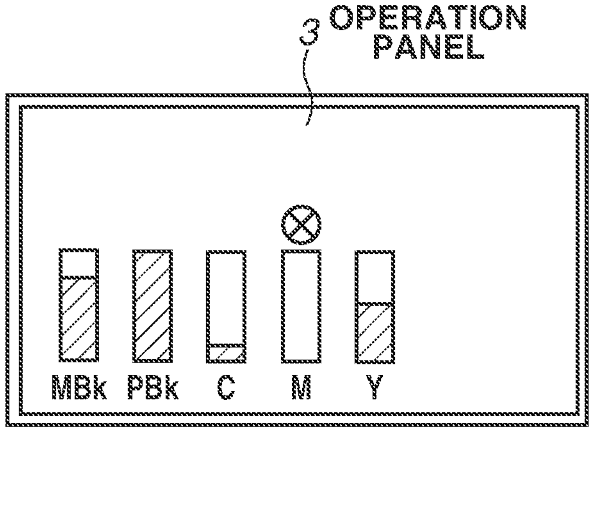
FIG. 4B illustrates a display example of an operation panel.

FIG. 4A illustrates another example of the layout of the indication units 2, and FIG. 4B illustrates a display example of the operation panel 3. As illustrated in FIG. 4A, each indication unit 2 may be provided on the front side of the corresponding door 5. If each indication unit 2 is provided on the front side of the corresponding door 5, it is possible to notify the user of the association between each indication unit 2 and the feed stage of the corresponding roll paper 4. Alternatively, each indication unit 2 may be provided on the upper side of the corresponding door 5. In the configuration illustrated in FIGS. 1A and 1B, each indication unit 2 is arranged at the right side of the corresponding door 5 and the operation panel 3 is also arranged at an upper right portion of the printing apparatus 1. Each indication unit 2 and the operation panel 3 may be arranged on the left side of the printing apparatus 1. It is desirable that information to be viewed by the user be collectively placed on one side of the printing apparatus 1 so that the user can easily perceive the information.

FIG. 4B illustrates the remaining amount of each color ink in a bar graph on the operation panel 3. In a case where the display areas for the remaining amount of the roll paper 4 illustrated in FIG. 2 are vertically arranged, the display areas for the remaining amount of each color ink are also arranged vertically, thus enabling the user to easily recognize the remaining amount.

Figure 5:
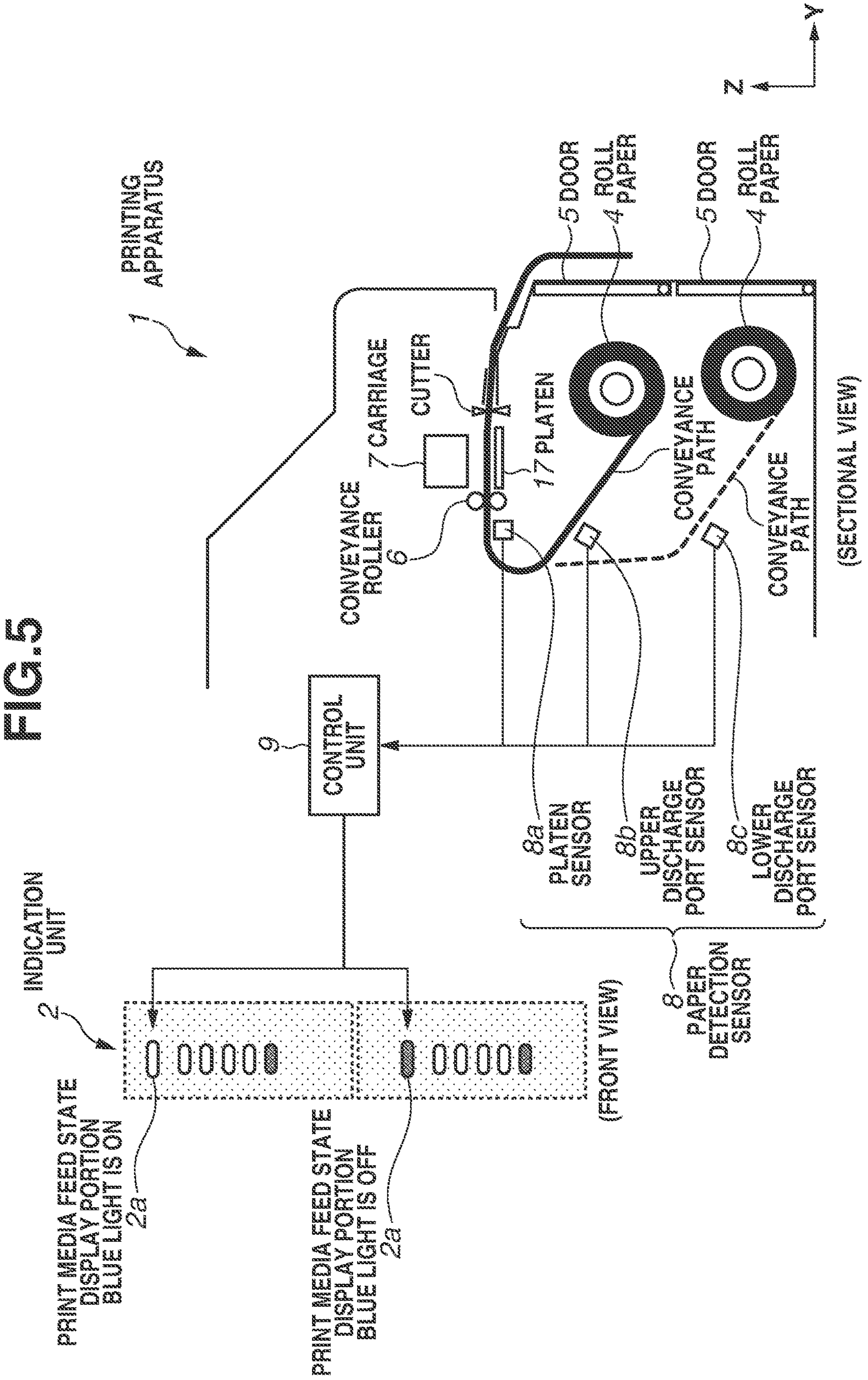
FIG. 5 illustrates a display of print media feed state display portions according to the first exemplary embodiment.

FIG. 5 is an explanatory view illustrating the display of each print media feed state display portion 2*a*. Descriptions of reference symbols described above in conjunction with FIGS. 1A and 1B are omitted. Conveyance rollers 6 convey the roll paper 4 onto a platen 17, and nip and convey the roll paper 4. A carriage 7 incorporates an image forming unit (not illustrated) that performs printing by ejecting ink while performing scanning in the vertical direction illustrated in FIG. 5. The conveyance rollers 6 are provided in the vicinity of an area where the carriage 7 performs scanning. In a state where the conveyance rollers 6 nip the roll paper 4, the roll paper 4 can be conveyed to a position opposed to the image forming unit on the platen 17, i.e., the roll paper 4 is in a printable state. A paper detection sensor 8 detects the presence or absence of the roll paper 4, and includes a platen sensor 8*a*, an upper discharge port sensor 8*b*, and a lower discharge port sensor 8*c*. The paper detection sensor 8 is an optical sensor, and includes the platen sensor 8*a* provided near the conveyance rollers 6, and the upper discharge port sensor 8*b* and the lower discharge port sensor 8*c* that are provided on a conveyance path leading from the roll portion of the roll paper 4 to the conveyance rollers 6. The upper discharge port sensor 8*b* and the lower discharge port sensor 8*c* are located at an upstream side of the platen sensor 8*a* in a conveyance direction, and are provided on the corresponding one of the two stages of set units on which the roll paper 4 is set. The upper discharge port sensor 8*b* and the lower discharge port sensor 8*c* are supply detection sensors that detect whether the roll paper 4 set in the corresponding stage is conveyed and supplied to the position corresponding to each sensor. FIG. 5 illustrates a state where the roll paper 4 in the upper stage is nipped by the conveyance rollers 6, or the roll paper 4 is fed, i.e., the roll paper 4 is in the printable state. When the user issues an instruction to feed paper through the operation panel 3, the conveyance rollers 6 and rollers (not illustrated) provided on the conveyance path are driven, so that the roll paper 4 in the stage for which paper feeding is instructed is fed in the printable state. The printing apparatus 1 starts printing on the fed roll paper 4 in response to the instruction to execute printing in this state from the user.

In the state illustrated in FIG. 5, the roll paper 4 in the lower stage is set and is not fed yet. In this case, the platen sensor 8*a* and the upper discharge port sensor 8*b* detect paper, and the lower discharge port sensor 8*c* does not detect paper. A control unit 9 determines whether the roll paper 4 in each stage is nipped by the conveyance rollers 6 based on the result of the detection made by the paper detection sensor 8, and controls lighting of the print media feed state display portion 2*a* of each indication unit 2. In the present exemplary embodiment, the platen sensor 8*a* functions as a nip detection sensor or a print media feed detection sensor. When the platen sensor 8*a* detects roll paper, the control unit 9 determines that the roll paper is nipped by the conveyance rollers 6. In the state illustrated in FIG. 5, the control unit 9 turns on the print media feed state display portion 2*a* corresponding to the state where the roll paper 4 in the upper stage is nipped by the conveyance rollers 6, and turns off the print media feed state display portion 2*a* in the lower stage in which the roll paper 4 is not nipped. In the present exemplary embodiment, the print media feed state display portion 2*a* emits blue light. However, the color of light emitted by the print media feed state display portion 2*a* is not limited to blue light. When the print media feed state display portion 2*a* is turned on, the user is informed that the roll paper 4 corresponding to the turned-on print media feed state display portion 2*a* is in the printable state and the roll paper 4 cannot be replaced in this state because the roll paper 4 is nipped by the conveyance rollers 6. The notification of the print media feed state made by each indication unit 2 is performed at least during printing. The expression "during printing" indicates a period in which the carriage 7 performs scanning and ink is ejected onto a print medium from the image forming unit. The notification may be performed in a standby state where recording (printing) is not executed, or may be performed constantly in a power-on state.

In a case where the user replaces the roll paper on which printing has not been performed, during printing, a printing operation is not interrupted. In other words, the printing operation is not interrupted even when the door 5 is opened. The printing operation may be interrupted in a case where the door 5 corresponding to the stage in which the roll paper 4 on which printing has been performed is set is opened during printing of the roll paper 4 fed in the printable state.

The printing apparatus 1 may include a lock mechanism that prohibits the user from opening the corresponding door 5. In such a case, the door 5 corresponding to the stage in which the roll paper 4 on which printing is being performed is set is locked by the lock mechanism during printing. Since the door 5 corresponding to the stage in which the roll paper 4 on which printing is being performed is set is locked by the lock mechanism, the user cannot replace the roll paper 4 even if the user tries to replace the roll paper 4 on which printing is being performed.

The notification of the print media feed state as described above enables the user to recognize whether the roll paper 4 set in which stage is in the printable state from a little far from the printing apparatus 1, without the need for the user to open the door 5 or move to the front of the printing apparatus 1. The notification of the print media feed state is also performed during printing, thus preventing the user from accidentally opening the door 5 corresponding to the stage in which the roll paper 4 on which printing is being performed is accommodated during printing, which leads to a reduction in malfunction caused due to accidental opening of the door 5. For example, if the door 5 corresponding to the upper stage is opened in the configuration illustrated in FIG. 5, the leading edge of the roll paper 4 can be caught in the door 5, which may cause a paper jam. The above-described configuration prevents the user from accidentally opening the corresponding door 5, thus preventing the occurrence of a paper jam due to opening or closing of the corresponding door 5 to check the print media feed state of the roll paper 4. Accordingly, the lock mechanism for preventing the user from accidentally opening the corresponding door 5 and a control system for the lock mechanism may be omitted in the configuration of the printing apparatus 1. Further, since it is possible to recognize which one of the stages is not in the printable state, the user can prepare for replacement of paper during printing, or can set the roll paper 4 by opening the door 5 corresponding to the stage in which the roll paper 4 that is not in the printable state is accommodated during printing.

Figure 6:
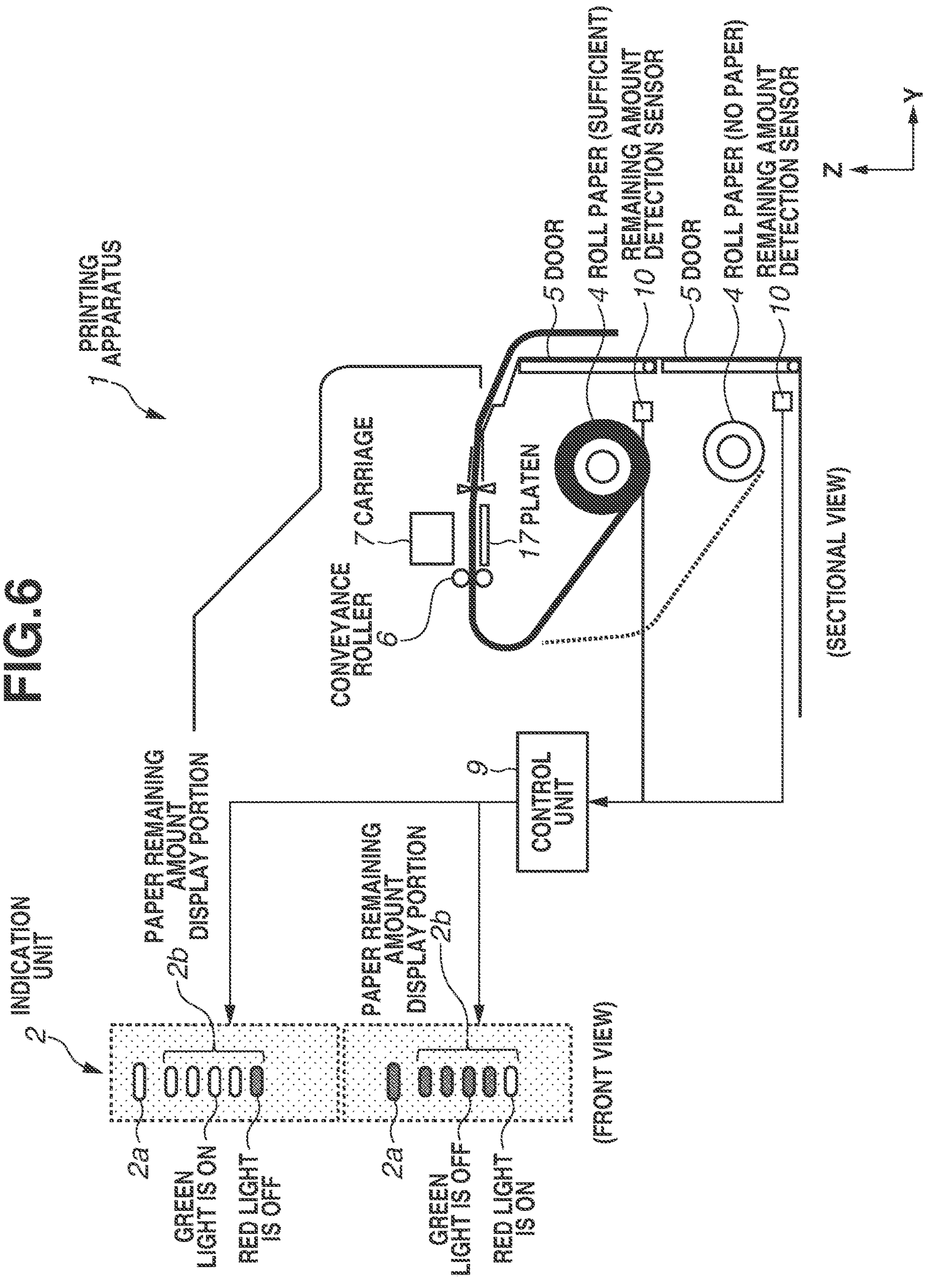
FIG. 6 illustrates a display of paper remaining amount display portions according to a second exemplary embodiment.

A second exemplary embodiment of the present disclosure will be described below. The paper remaining amount display portion 2*b* will be described with reference to FIG. 6. Descriptions of components similar to those according to the first exemplary embodiment are omitted.

Each remaining amount detection sensor 10 detects the remaining amount of the corresponding roll paper 4, and is provided to the corresponding one of the roll papers 4. One of an optical sensor and a mechanical sensor is applied to each remaining amount detection sensor 10. Each remaining amount detection sensor 10 measures a distance from the sensor to the corresponding roll paper 4, thus detecting the paper remaining amount. The control unit 9 converts an amount obtained by subtracting the measured distance from a stored remaining amount into a remaining amount of each roll paper 4, based on the result of the detection made by the remaining amount detection sensor 10, and controls lighting of each of the print media feed state display portion 2*a* and the paper remaining amount display portion 2*b* of each indication unit 2. In the configuration illustrated in FIG. 6, the control unit 9 converts the remaining amount of the set roll paper 4, i.e., the length of the remaining roll paper 4, into five levels, and controls lighting of four green lights and a lowermost red light of the paper remaining amount display portion 2*b*. For example, when the remaining amount of the roll paper 4 is more than 90 m, as illustrated in FIG. 7A, the four green lights are turned on and the red light is turned off. When the paper remaining amount is in a range from 90 m to 40 m, as illustrated in FIG. 7B, the uppermost green light is turned off and the other green lights are turned on, and the red light is turned off. When the paper remaining amount is in a range from 40 m to 10 m, as illustrated in FIG. 7C, the two upper green lights are turned off, the two lower green lights are turned on, and the red light is turned off. When the paper remaining amount is less than or equal to 10 m, as illustrated in FIG. 7D, the three upper green lights are turned off, the lowermost green light is turned on, and the red light is turned off. When there is no remaining paper, as illustrated in FIG. 7E, all the four green lights are turned off and the one red light is turned on. Each remaining amount detection sensor 10 also detects a state where no roll paper is set. Accordingly, each remaining amount detection sensor 10 also functions as a set detection sensor. Even when the roll paper 4 is not set, the one red light in the paper remaining amount display portion 2*b* is turned on as illustrated in FIG. 7E. Thus, the lighting portion indicating that there is no paper also functions as a set state lighting portion indicating whether the roll paper 4 is set.

The colors of emitted light are not particularly limited. However, the colors of light emitted from the print media feed state display portion 2*a* and the paper remaining amount display portion 2*b* described in the first exemplary embodiment may be desirable to be different. Further, among the colors of lighting portions in the paper remaining amount display portion 2*b*, one that is used to indicate that there is no paper may be desirable to be different from the others. In the present exemplary embodiment, in a case where there is no remaining paper, only the lowermost red light is turned on in the paper remaining amount display portion 2*b*. Alternatively, the paper remaining amount display portion 2*b* may be configured such that all the green lights are turned on, and all the green lights may be turned off when there is no remaining paper. However, as described above, in a case where there is no remaining paper, the user can be informed that there is no remaining paper in an emphasized manner by turning on light with a different color (red in this case). In the configuration illustrated in FIGS. 7A to 7G, all the plurality of lighting portions in the paper remaining amount display portion 2*b* has the same length, among the plurality of lighting portions that can be seen from the front side of the housing of the printing apparatus 1, but instead the lengths of lighting portions in the paper remaining amount display portion 2*b* may be changed. For example, as illustrated in FIG. 7F, the length of each of the lighting portions in the paper remaining amount display portion 2*b* may be set such that the longer length of a lighting portion indicates a larger remaining amount. The number of the lighting portions in the paper remaining amount display portions 2*b* is not limited to five. Further, the conditions for the length of the remaining paper described above are merely examples, and are not limited to these examples. In particular, the red light indicating that there is no remaining paper may indicate that only an extremely small amount of paper is left. The red light may be turned on when the paper remaining amount is less than or equal to a predetermined amount, and it may be preferable to turn on the red light before the remaining paper amount reaches zero.

Each indication unit 2 displays the paper remaining amount as described above, thus enabling the user to easily check the paper remaining amount from a little far from the printing apparatus 1, without the need for the user to move to the front of the printing apparatus 1 or directly check the remaining amount of the roll paper 4. Since the user can check the remaining amount at a glance, the user can replace the roll paper 4 before sending a large number of print jobs to the printing apparatus 1 if the paper remaining amount is small, which leads to a reduction in the interruption of printing due to a lack of the roll paper 4 during printing. Further, since the user can prepare for the roll paper 4 to be replaced during printing, the user can effectively perform printing.

The lighting portions in the paper remaining amount display portion 2*b* to be displayed may be turned on in accordance with not only on the length of paper, but also, for example, the number of remaining sheets to be printed. The number of remaining sheets to be printed is calculated by the control unit 9 by converting the length of the remaining amount into the number of remaining sheets to be printed in a frequently-used paper size as illustrated in FIG. 7G. Thus configuration enables the user to check the number of remaining sheets to be printed. Accordingly, the user can accurately recognize whether the roll paper 4 is sufficient based on the number of sheets to be printed.

A third exemplary embodiment of the present disclosure will be described below. The display of the print media feed state and the paper remaining amount has been described above. The indication units 2 according to the third exemplary embodiment can display the width of the roll paper 4.

A configuration for displaying the width of the roll paper 4 set in the printing apparatus 1 will be described with reference to FIG. 8. Descriptions of components similar to those of the above-described exemplary embodiments are omitted.

Figure 8:
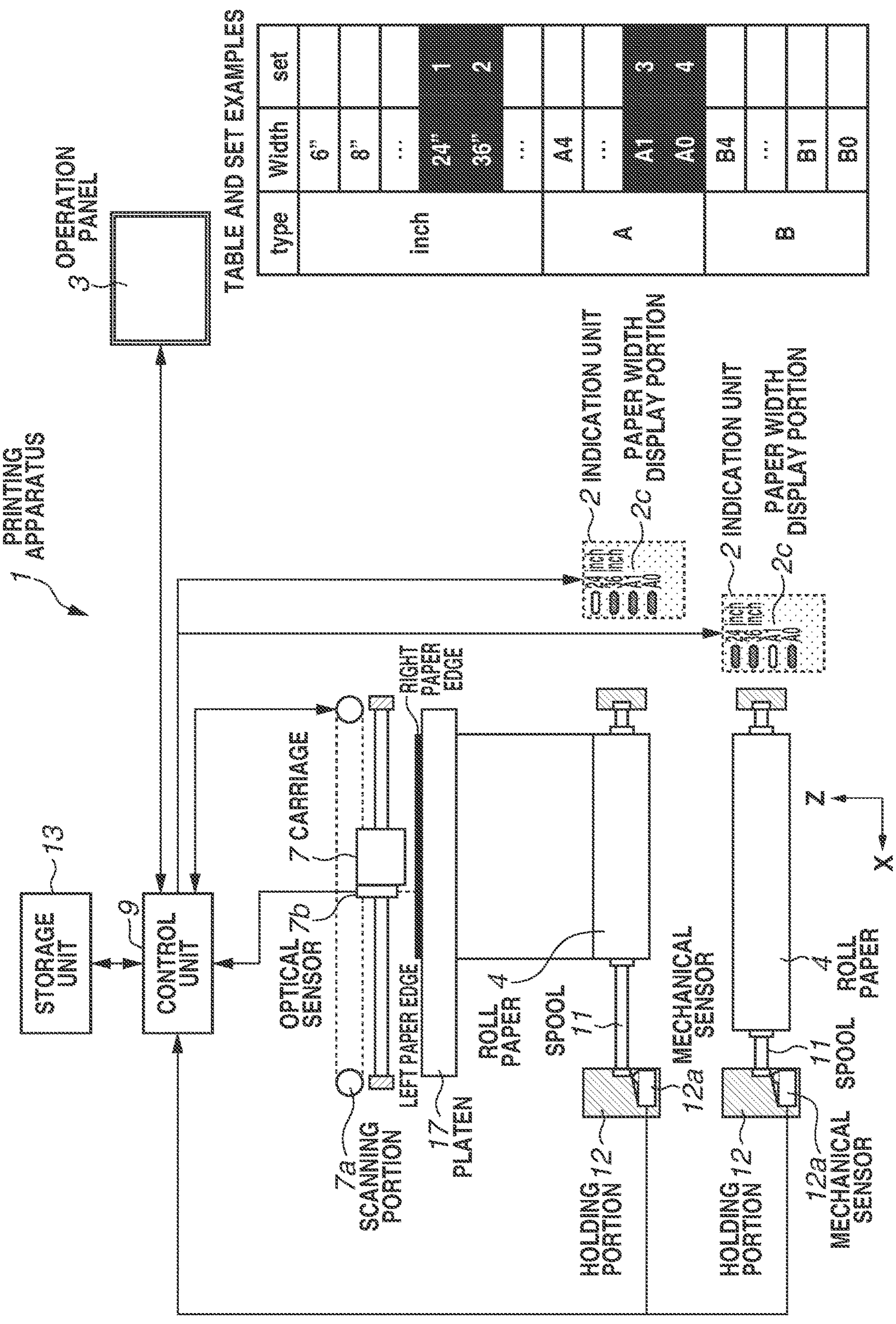
FIG. 8 illustrates an internal configuration and a control configuration of a printing apparatus according to a third exemplary embodiment.

FIG. 8 illustrates an internal configuration and a control configuration of the printing apparatus 1. Holding portions 12 are provided in the printing apparatus 1 and hold the spool 11. Each holding portion 12 is provided with a mechanical sensor 12*a* that detects the presence or absence of the spool 11.

When the roll paper 4 is set in the holding portion 12 with the spool 11 therebetween and the roll paper 4 is conveyed, the roll paper 4 is nipped by the conveyance rollers 6 (not illustrated in FIG. 8). The conveyance rollers 6 have the same configuration as that illustrated in FIG. 1. When the control unit 9 determines that the roll paper 4 is nipped by the conveyance rollers 6 in the manner as described in the first exemplary embodiment, a scanning portion 7*a* is driven to scan the carriage 7. In this case, the right and left edges of the fed roll paper 4 are detected by an optical sensor 7*b* that is mounted on the carriage 7. Further, the control unit 9 obtains the paper width of the roll paper 4 based on the scanning distance of the carriage 7 and the right and left paper edges detected by the optical sensor 7*b*, and controls lighting of a paper width display portion 2*c* of each indication unit 2 in accordance with the acquired paper width, thus turning on the lighting portions corresponding to the detected paper width. As in each indication unit 2 illustrated in FIG. 2, the paper width display portion 2*c* (width lighting portion) includes a light-emitting portion, a substrate, a light guide, and a lighting portion.

As illustrated in FIG. 8, the roll paper 4 in the upper stage is nipped by the conveyance rollers 6 (not illustrated). If it is determined that the width of the nipped roll paper 4 is, for example, 24 inches, the control unit 9 turns on the lighting portion corresponding to the paper width of 24 inches in the paper width display portion 2*c* of the indication unit 2 corresponding to the upper stage. Further, the paper width display portion 2*c* of the indication unit 2 corresponding to the roll paper 4, which is previously fed, has the detected paper width, and is accommodated in the lower stage, turns on light corresponding to "A0". The indication units 2 according to the present exemplary embodiment are arranged at the same locations as the indication units 2 illustrated in FIGS. 1A and 1B. Once the paper width of the roll paper 4 is obtained, the feed stage and paper width information are stored in association with each other in the storage unit 13 until the mechanical sensor 12*a* detects the removal of the spool 11, and the control unit 9 continuously performs display in the paper width display portion 2*c* of each indication unit 2. Each indication unit 2 displays the paper width as described above, so that the user can easily recognize the paper width of the roll paper 4 set in the printing apparatus 1, regardless of the print media feed state, even in a state where the doors 5 (not illustrated) are closed. Further, a combination with the print media feed state display portion 2*a* described in the first exemplary embodiment enables the user to set and replace the roll paper 4 of a desired width by opening the door 5 corresponding to the stage in which the roll paper 4 that is not nipped by the conveyance rollers 6 is accommodated, even during the printing operation by the printing apparatus 1.

Various types of paper with different widths are used as the roll paper 4, and if a large number of lighting portions of the paper width display portion 2*c* are provided so as to correspond to the various types of paper, the surface area of each indication unit 2 with respect to the printing apparatus 1 is increased. However, the paper width of the roll paper 4 to be actually used is limited to some extent for each user. Accordingly, the paper width to be displayed on the paper width display portion 2*c* of each indication unit 2 may be set preliminarily. This preliminary setting is made by operating the operation panel 3 so that the frequently-used paper width can be displayed on the paper width display portion 2*c* of each indication unit 2. FIG. 8 illustrates set examples in a table. In the table illustrated in FIG. 8, blacked-out items, i.e., 24 inches, 36 inches, A1, and A0, are selected.

As described above, the paper width of the roll paper 4 frequently used by the user can be displayed in the paper width display portion 2*c* with a small display area.

A fourth exemplary embodiment of the present disclosure will be described below. While the third exemplary embodiment described above illustrates the paper width display portion 2*c* of each indication unit 2, a fourth exemplary embodiment illustrates an example of a paper type display with reference to FIG. 9. Descriptions of components similar to those of the above-described exemplary embodiments are omitted.

Figure 9:
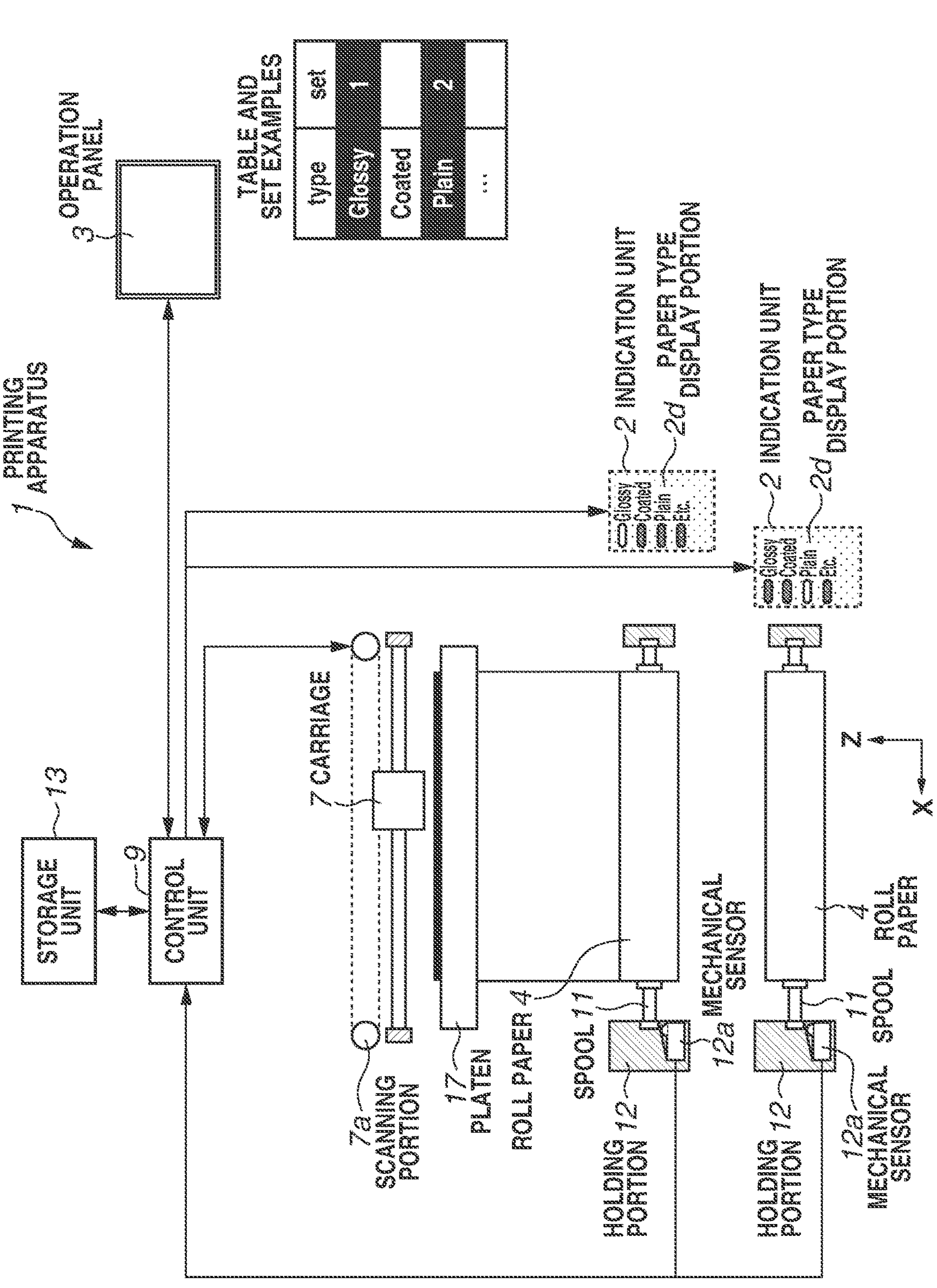
FIG. 9 illustrates an internal configuration and a control configuration of a printing apparatus according to a fourth exemplary embodiment.

When the roll paper 4 is set in each holding portion 12 with the spool 11 therebetween and the roll paper 4 is conveyed, the roll paper 4 is nipped by the conveyance rollers 6 (not illustrated in FIG. 9). The conveyance rollers 6 have a configuration similar to that illustrated in FIGS. 1A and 1B. After the roll paper 4 is nipped by the conveyance rollers 6, the control unit 9 prompts, through the operation panel 3, the user to set the paper type of the roll paper 4 on the operation panel 3. Typical examples of the paper type include glossy paper (glossy), coated paper (coated), and plain paper (plain). When the user inputs and sets any one of such paper types, the control unit 9 acquires the type of set paper, and causes the indication unit 2 to turn on the lighting portion corresponding to the paper type acquired in a lighting control operation, in a paper type display portion 2*d* (type lighting portion). As in each indication unit 2 illustrated in FIG. 2, the paper type display portion 2*d* includes a light-emitting portion, a substrate, a light guide, and a lighting portion. In some cases, the user selects a paper type other than the typical paper types. Thus, in the paper type display portion 2*d* of each indication unit 2, the lighting portion corresponding to "etc.", which indicates that the roll paper 4 of any one of the other paper types is set is turned on. The indication units 2 according to the present exemplary embodiment are arranged at locations similar to those for the indication units 2 illustrated in FIGS. 1A and 1B. The display of the paper type on each indication unit 2 as described above enables the user to easily recognize the paper type of the roll paper 4 set in the printing apparatus 1 even in a state where the doors 5 (not illustrated) are closed.

FIG. 9 illustrates a state where the roll paper 4 in the upper stage is nipped by the conveyance rollers 6 (not illustrated) and the user sets glossy paper and the lighting portion corresponding to "glossy" in the paper type display portion 2*d* is turned on to thereby indicate that the roll paper 4 in the upper stage is glossy paper. Further, the paper type display portion 2*d* of the indication unit 2 corresponding to the roll paper 4 that is previously fed and is accommodated in the lower stage for which plain paper is set as the paper type turns on light indicating "plain". Once the paper type of the roll paper 4 is input and set, the feed stage and paper type information are stored in association with each other in the storage unit 13 until the removal of the spool 11 is detected by the mechanical sensor 12*a*, and the control unit 9 continuously performs the display on the paper type display portion 2*d* of each indication unit 2. Each display portion 2 displays the paper type as described above, so that the user can easily recognize the paper type of the roll paper 4 set in the printing apparatus 1, regardless of the print media feed state, even in a state where the doors 5 (not illustrated) are closed.

Further, a combination with the print media feed state display portion 2*a* described in the first exemplary embodiment enables the user to set and replace the roll paper 4 of a desired paper type by opening the door 5 corresponding to the stage in which the roll paper 4 that is not nipped by the conveyance rollers 6 is accommodated, even during the printing operation.

If the thickness of paper can be identified based on the paper type, not only detection values obtained by each remaining amount detection sensor 10 described in the second exemplary embodiment, but also a more accurate paper remaining amount can be obtained. Thus, a more accurate remaining amount can be displayed on the paper remaining amount display portion 2*b*.

A fifth exemplary embodiment of the present disclosure will be described below. The exemplary embodiments described above illustrate an example where each indication unit 2 displays the state of the corresponding roll paper 4. In the fifth exemplary embodiment, a time for completing printing is displayed on each indication unit 2. Descriptions of components similar to those of the above-described exemplary embodiments are omitted.

Figure 10:
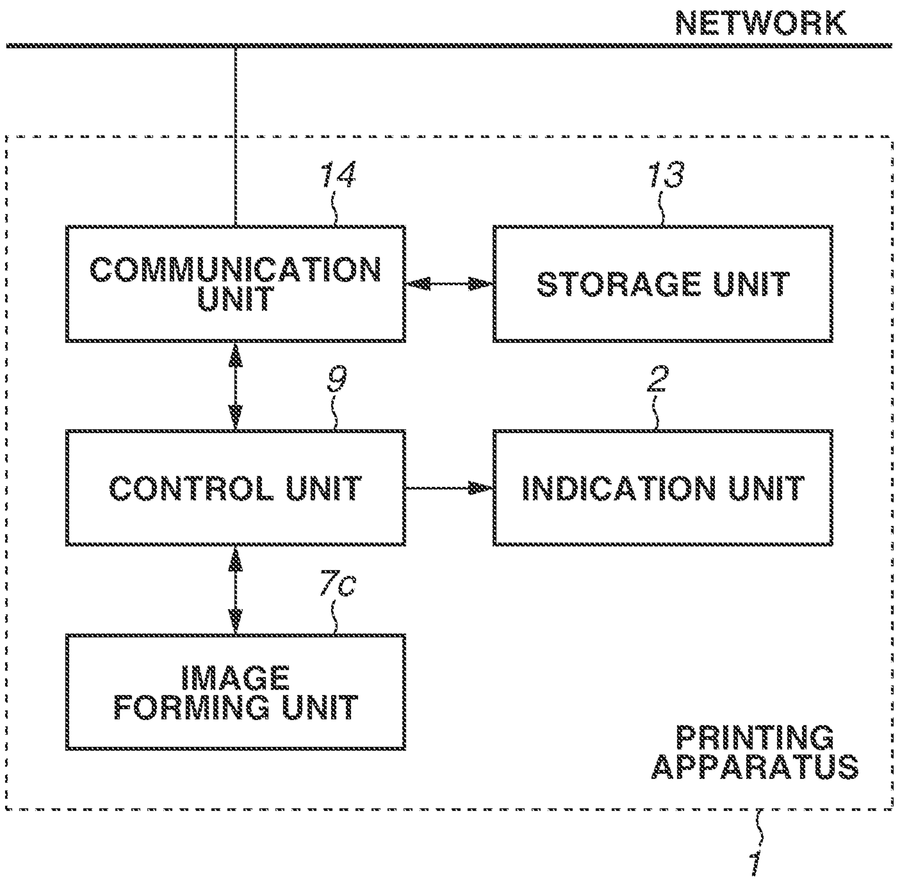
FIG. 10 is a block diagram illustrating a printing apparatus according to a fifth exemplary embodiment.

FIG. 10 is a block diagram illustrating the printing apparatus 1. In the printing apparatus 1, print information that is sent from a host apparatus via a network and includes image information to be printed is received by a communication unit 14 and is stored in a storage unit 13. The control unit 9 extracts the print information from the storage unit 13, and analyzes the print information, thus calculating an estimated printing time and acquiring the time. Further, as illustrated in FIG. 11B, the estimated time is set as the time for completing printing, and the time for completing printing is displayed in a print completion time display portion 2*e* (time lighting portion) of the indication unit 2 illustrated in FIG. 11A. Further, the control unit 9 causes an image forming unit 7*c* mounted on the carriage 7 to eject ink to perform printing on the roll paper 4, while scanning the carriage 7.

Figure 11A:
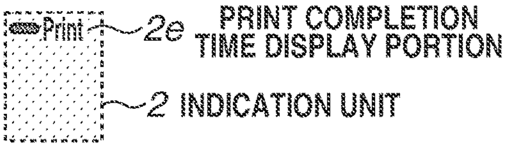
FIGS. 11A to 11H illustrate an indication unit and a control operation according to the fifth exemplary embodiment.
Figure 11B:
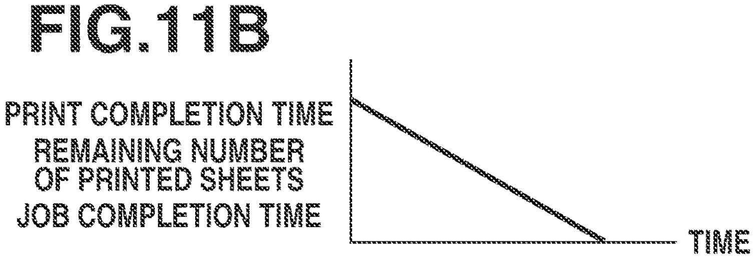
Figure 11C:

FIG. 11A indicates the indication unit 2 according to the present exemplary embodiment. The indication unit 2 includes the print completion time display portion 2*e*. As in each indication unit 2 illustrated in FIG. 2, the print completion time display portion 2*e* includes a light-emitting portion, a substrate, a light guide, and a lighting portion. In the present exemplary embodiment, the print completion time display portion 2*e* is caused to perform a blinking operation to notify the user of the remaining print completion time. FIGS. 11C to 11F illustrate blinking patterns of the print completion time display portion 2*e*. As illustrated in FIG. 11C, the print completion time display portion 2*e* is caused to perform the blinking operation with a high frequency when the print completion time is long, and the frequency is gradually decreased as the remaining print completion time decreases, and then the print completion time display portion 2*e* is finally turned off. This configuration enables the user to recognize that a longer cycle of blinking indicates that printing is almost completed.

Figure 11D:
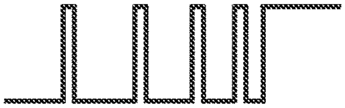
Figure 11E:
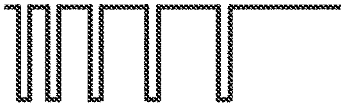
Figure 11F:
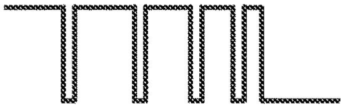

The display pattern of the print completion time is not limited to such an example. Another configuration example will be described below. As illustrated in FIG. 11D, when the remaining print completion time is long, the blinking operation is performed with a low frequency, and the frequency of blinking is gradually increased as the remaining print completion time decreases, and then the print completion time display portion 2*e* is finally turned on. Alternatively, as illustrated in FIG. 11E, blinking patters illustrated in FIGS. 11E and 11F may be obtained by reversing the turning-on time and the turning-off time illustrated in FIGS. 11C and 11D.

As described above, only one lighting portion is provided in the print completion time display portion 2*e* of each indication unit 2 to notify the print completion time based on the frequency modulation of blinking of the lighting portion. This arrangement enables the print completion time to be displayed with a minimum area and a single color. Thus, the user can easily recognize the print completion time. Consequently, it is expected that stress felt by the user from not being able to recognize the print completion time is reduced.

Figure 11G:
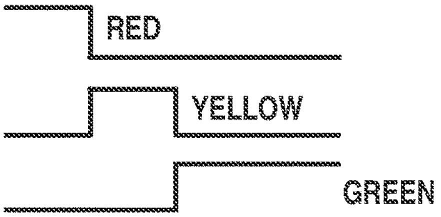

While a single color is displayed in the blinking operation in the above examples, the print completion time may be notified using a plurality of colors. In addition to the blinking operation, as illustrated in FIG. 11G, the print completion time display portion 2*e* may change the color such that red light is turned on when the print completion time is long and then yellow light is turned on and green light is finally turned on. This display method enables also display of the print completion time with a minimum area. The colors to be used and the order of lighting are not limited to these examples.

Figure 11H:
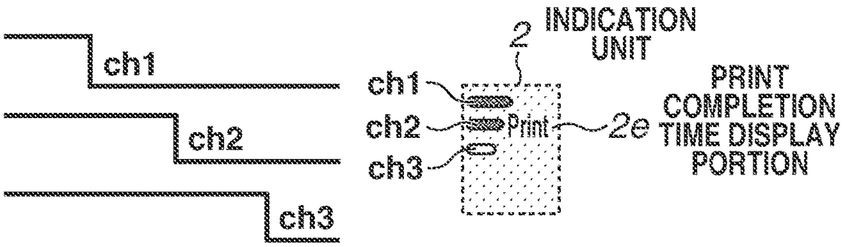

A plurality of lighting portions may be provided in the print completion time display portion 2*e*. In a case where three channels are set as illustrated in FIG. 11H, when the print completion time is long, all the channels are turned on and then the channels are turned off in the order of ch1 and ch2, and all the channels ch1 to ch3 are turned off in the end. Thus, the print completion time display portion 2*e* includes a plurality of lighting portions, thus enabling intuitive display of the print completion time. Further, the width of the print completion time display portion 2*e* is gradually decreased in order from ch1 to ch3, resulting in enhancement of the expression of the print completion time. While the present exemplary embodiment illustrates a method in which the channels are sequentially turned off as the print completion time decreases, all the channels may be turned off first and then may be sequentially turned on. Similarly, the width of the print completion time display portion 2*e* may be gradually increased.

While the above-described exemplary embodiment illustrates a display method for notifying the remaining print completion time, the remaining number of sheets to be printed may be displayed on the indication units 2.

Further, since the printing apparatus 1 is connected to the network as illustrated in FIG. 10, a plurality of users can send their print information to the printing apparatus 1. The control unit 9 may display the print completion time based on one piece of print information, or may display the total print completion time for printing based on all pieces of print information currently received on the indication units 2.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a plurality of set units for setting print media, wherein the print media is a plurality of rolled print media;

a conveyance unit having conveyance rollers and configured to convey the print media;

a printing unit configured to print an image on the print media on a platen conveyed by the conveyance unit;

a plurality of print media feed state indication units, each provided on a different one of the plurality of set units and configured to indicate whether a print medium set in a corresponding set unit of the plurality of set units is being fed to a position at which is the print medium is nipped between the conveyance rollers;

wherein, when the printing unit performs printing on the print medium, each of the plurality of print media feed state indication units indicates whether the print medium set in the corresponding set unit is being fed in accordance with a result of detection.

2. The printing apparatus according to claim 1, wherein each of the plurality of print media feed state indication units indicates whether the print medium set in the corresponding set unit is being fed, even in a case where the printing unit is in a standby state to wait for printing on the print medium.

3. The printing apparatus according to claim 1, further comprising a plurality of set state indication units, each provided on the different one of the plurality of set units and configured to indicate a state of the print medium set in the corresponding set unit.

4. The printing apparatus according to claim 3, wherein a corresponding set state indication unit of the plurality of set state indication units is configured to be turned off or turned on.

5. The printing apparatus according to claim 4, further comprising a set detection unit configured to detect the print medium set in the corresponding set unit, wherein the corresponding set state indication unit of the plurality of set state indication units is turned off or turned on according to the result of detection performed by the set detection unit.

6. The printing apparatus according to claim 5, wherein, in a case where a result of detection performed by the set detection unit indicates that the print medium has been detected, the corresponding set state indication unit of the plurality of set state indication units is turned off, and wherein, in a case where the result of detection performed by the set detection unit indicates that the print medium has not been detected, the corresponding set state indication unit of the plurality of set state indication units is turned on.

7. The printing apparatus according to claim 3, wherein at least one of the plurality of set state indication units is turned on with red light.

8. The printing apparatus according to claim 1, wherein the platen is provided at a position where the platen faces the printing unit, and the conveyance rollers are located in proximity to the platen.

9. The printing apparatus according to claim 1, wherein, in a case where the print medium has been conveyed to the position at which is the print medium is nipped between the conveyance rollers, a corresponding print media feed state indication unit of the plurality of print media feed state indication units is turned on with a first color, and wherein, in a case where print medium has not been conveyed to the nipped position, the corresponding print media feed state indication unit of the plurality of print media feed state indication units is turned on with a second color different from the first color or is turned off.

10. The printing apparatus according to claim 9, wherein at least one of the plurality of print media feed state indication units is turned on with blue light.

11. The printing apparatus according to claim 1, further comprising a detection unit configured to detect whether any one of the plurality of rolled print media is fed to a position at which printing is performable by the printing unit.

12. The printing apparatus according to claim 11, wherein the conveyance unit is configured to nip and convey the print medium, wherein the detection unit includes a nip detection unit configured to detect whether the print medium is being nipped by the conveyance unit, and includes a supply detection unit provided, for each set unit of the plurality of set units, on an upstream side of the nip detection unit in a conveyance direction, wherein, in a case where a result of detection performed by the nip detection unit indicates that the print medium is being nipped by the conveyance unit and a result of detection performed by a first supply detection unit indicates that the print medium has been detected, a lighting state of the print media feed state indication unit corresponding to a set unit that corresponds to the first supply detection unit is brought into a state indicating that the print medium has been conveyed to the performable printing position, wherein, in a case where the result of detection performed by the nip detection unit indicates that the print medium is being nipped by the conveyance unit and the result of detection by the first supply detection unit indicate that the print medium has not been detected, the lighting state of the print media feed state indication unit corresponding to the set unit that corresponds to the first supply detection unit is brought into a state indicating that the print medium has not been conveyed to the performable printing position, and wherein, in a case where the result of detection performed by the nip detection unit indicates that the print medium is not being nipped by the conveyance unit, the lighting state of the print media feed state indication unit is brought into the state indicating that the print medium has not been conveyed to the performable printing position.

13. The printing apparatus according to claim 12, wherein the conveyance unit is located near a position at which the printing unit performs printing on the print medium.

14. The printing apparatus according to claim 1, further comprising:

a remaining amount detection unit configured to detect a detected remaining amount of the print medium set in the corresponding set unit; and a remaining amount indication unit configured to indicate, as an indicate remaining amount, the detected remaining amount of the print medium set in the corresponding set unit, wherein a lighting state of the remaining amount indication unit is changed in accordance with a result of detection performed by the remaining amount detection unit.

15. The printing apparatus according to claim 14, wherein a print media feed state indication unit and a remaining amount indication unit that belong to the same indication unit are located close to each other and are aligned.

16. The printing apparatus according to claim 14, wherein a plurality of remaining amount indication units is provided on the remaining amount indication unit, and a number of remaining amount indication units in the plurality of remaining amount indication units to be turned on is changed in accordance with the indicated remaining amount of the print medium indicated by the result of detection by the remaining amount detection unit.

17. The printing apparatus according to claim 16, wherein, in a case where the indicated remaining amount is a first amount, a first number of remaining amount indication units are turned on, and, in a case where the indicated remaining amount is a second amount smaller than the first amount, a second number of remaining amount indication units are turned on, where the second number is less than the first number.

18. The printing apparatus according to claim 16, wherein the remaining amount indication unit includes plural remaining amount indication units and a first indication unit, each configured to light with a color, and wherein, in lighting, the first indication unit lights in a case where the indicated remaining amount is less than or equal to a predetermined amount and lights with a color different from a color with which the plural remaining amount indication units are configured to light.

19. The printing apparatus according to claim 18, wherein, in lighting, the first indication unit lights with a red color and the other remaining amount indication units light with a green color.

20. The printing apparatus according to claim 16, wherein a color of light of the remaining amount indication unit is different from a color of light of the plurality of print media feed state indication units.

21. The printing apparatus according to claim 1, further comprising:

a width acquisition unit configured to acquire a width of the print medium set in the corresponding set unit; and a plurality of width indication units configured to indicate, as an indicated width, the acquired width of the print medium set in the corresponding set unit, wherein, in a case where an indicated width of a width indication unit among the plurality of width indication units corresponds to the width acquired by the width acquisition unit, the width indication unit is turned on.

22. The printing apparatus according to claim 1, further comprising:

a type acquisition unit configured to acquire a type of the print medium set in the corresponding set unit; and a plurality of type indication units configured to indicate, as an indicated type, the acquire type of the print medium set in the corresponding set unit, wherein, in a case where an indicated type of a type indication unit among the plurality of type indication units corresponds to the type acquired by the type acquisition unit, the type indication unit is turned on.

23. The printing apparatus according to claim 1, further comprising:

a time acquisition unit configured to acquire a time for completing printing by the printing unit; and a time indication unit configured to indicate, as an indicated time, the acquire time for completing printing, and to change a lighting cycle of the time indication unit in accordance with the acquired time for completing printing acquired by the time acquisition unit.

24. The printing apparatus according to claim 1, further comprising:

a time acquisition unit configured to acquire a time for completing printing by the printing unit; and a time indication unit configured to indicate, as an indicated time, the acquire time for completing printing, and to change a color of light displayed by the time indication unit when turned on in accordance with the acquired time for completing printing acquired by the time acquisition unit.

25. The printing apparatus according to claim 1, wherein a color of light of the plurality of print media feed state indication units is different from a color in an area surrounding the plurality of print media feed state indication units.

26. The printing apparatus according to claim 25, wherein the color in the area surrounding the plurality of print media feed state indication units is a white color.

27. The printing apparatus according to claim 1, further comprising one of a door and a drawer configured to be opened in setting the print medium into the corresponding set unit.

28. The printing apparatus according to claim 27, wherein, in a case where the door or the drawer is part of a set unit on which a print medium that is not fed to a predetermined printable position is set and while the printing unit is performing printing on the print medium, the printing being performed is not stopped even in a case where either the door or the drawer of the set unit is opened.

29. The printing apparatus according to claim 27, wherein the print media feed state indication unit is provided on a surface of the printing apparatus where either the door or the drawer is opened.

30. The printing apparatus according to claim 1, further comprising an operation panel used for a user to issue an instruction to the printing apparatus.

31. The printing apparatus according to claim 30, wherein the plurality of print media feed state indication units, a plurality of set state indication units, and the operation panel are arranged on the same side and on a side that is one of right and left sides of the printing apparatus.

32. The printing apparatus according to claim 1, further comprising:

a plurality of set units for setting a plurality of print media; and a plurality of the print media feed state indication units, each corresponding to a different one of the plurality of set units, wherein each of the plurality of print media feed state indication units is located near a corresponding set unit of the plurality of set units, and each of the plurality of print media feed state indication units indicates a state of the corresponding set unit.

* * * * *